United States Patent
Rajauria et al.

(10) Patent No.: US 9,595,281 B2
(45) Date of Patent: Mar. 14, 2017

(54) TUNABLE CONTACT DETECTION SENSITIVITY TO DIRECTLY MEASURE CLEARANCE OF PROTRUSIONS IN MAGNETIC RECORDING HEADS

(71) Applicant: HGST Netherlands B.V., Amsterdam (NL)

(72) Inventors: Sukumar Rajauria, San Jose, CA (US); Erhard Schreck, San Jose, CA (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 0 days.

(21) Appl. No.: 14/823,775

(22) Filed: Aug. 11, 2015

(65) Prior Publication Data

US 2017/0047089 A1    Feb. 16, 2017

(51) Int. Cl.
*G11B 5/09* (2006.01)
*G11B 5/60* (2006.01)
G11B 5/00 (2006.01)

(52) U.S. Cl.
CPC ............ *G11B 5/6076* (2013.01); *G11B 5/607* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 6,529,342 B1* | 3/2003 | Feng | .................... | G11B 5/6017 360/31 |
| 7,660,068 B1* | 2/2010 | Baumgart | ................ | G11B 5/40 360/234.4 |
| 7,719,786 B1* | 5/2010 | Baumgart | ............ | G11B 5/6005 360/75 |
| 8,059,357 B1* | 11/2011 | Knigge | ................. | G11B 5/6011 360/75 |
| 8,837,070 B1 | 9/2014 | Johnson et al. | | |
| 8,873,353 B1 | 10/2014 | Riddering | | |
| 8,897,104 B1 | 11/2014 | Yan et al. | | |
| 2010/0123967 A1* | 5/2010 | Batra | .................... | G11B 5/1278 360/59 |
| 2010/0157454 A1* | 6/2010 | Chen | ...................... | G11B 27/36 360/30 |
| 2011/0038081 A1* | 2/2011 | Contreras | .............. | B82Y 25/00 360/125.03 |

(Continued)

OTHER PUBLICATIONS

A New AFM-Based Technique to Detect the NFT Protrusion on HAMR Head <http://ieeexplore.ieee.org/xpl/articleDetails.jsp?arnumber=6559049>.

*Primary Examiner* — Peter Vincent Agustin
(74) *Attorney, Agent, or Firm* — Patterson & Sheridan, LLP

(57) ABSTRACT

Embodiments disclosed herein generally relate to contact at the disk by the recording head in a hard disk drive. In one embodiment, a direct current is applied to an element in a HAMR head. An alternating current is then applied to the element over top of the direct current to cause the HAMR head to dither. By monitoring the head signal at the dither frequency, a touchdown or contact of a NFT on a disk may be detected based upon variations in the produced signal.

20 Claims, 6 Drawing Sheets

(56) References Cited

U.S. PATENT DOCUMENTS

| | | | |
|---|---|---|---|
| 2011/0149428 A1* | 6/2011 | Franca-Neto | G11B 5/6029 360/75 |
| 2011/0286129 A1* | 11/2011 | Prabhakaran | G11B 5/607 360/59 |
| 2012/0201108 A1* | 8/2012 | Zheng | G11B 5/607 369/13.26 |
| 2013/0286802 A1 | 10/2013 | Kiely | |
| 2014/0139945 A1* | 5/2014 | Canchi | G11B 5/6029 360/75 |
| 2014/0269819 A1 | 9/2014 | Kiely et al. | |
| 2015/0055441 A1 | 2/2015 | Rejda et al. | |

* cited by examiner

TUNABLE CONTACT DETECTION SENSITIVITY TO DIRECTLY MEASURE CLEARANCE OF PROTRUSIONS IN MAGNETIC RECORDING HEADS

BACKGROUND

Field

Embodiments disclosed herein generally relate to a magnetic disk device employing a heat assisted magnetic recording (HAMR) head.

Description of the Related Art

To achieve a high signal-to-noise ratio (SNR) in a magnetic disk device that employs a HAMR head, one common technique used is to touch the stationary HAMR head on the disk and then back the head off of the disk. By utilizing this back-off technique, the required SNR can be obtained and the clearance height between the disk and the head may be estimated. Estimating or calculating the clearance of the head can be helpful to ensuring accurate performance of the HAMR head.

Additionally, a near-field transducer (NFT) may be utilized in a HAMR head to locally heat magnetic media having high coercivity during recording to lower the coercivity of the localized region. However, due to thermal expansion, the NFT may unintentionally touch down or contact the disk during operation or when employing the back-off technique. Since the NFT is typically significantly smaller than the other elements in the HAMR head, it can be difficult to determine when the NFT makes contact with the disk. When the NFT contacts the disk, the NFT may physically degrade, and consequently, the magnetic disk device may be damaged. Thus, knowing when the NFT touches down on the disk may prevent both the NFT and the magnetic disk device from degrading.

Therefore, an improved HAMR head that is able to detect NFT touchdown or contact is needed.

SUMMARY

Embodiments disclosed herein generally relate to contact at the disk by the recording head in a hard disk drive. In one embodiment, a direct current is applied to an element in a HAMR head. An alternating current is then applied to the element over top of the direct current to cause the HAMR head to dither. By monitoring the head signal at the dither frequency, a touchdown or contact of a NFT on a disk may be detected based upon variations in the produced signal.

In one embodiment, a method comprises applying a direct current to a thermal fly height control element of a magnetic recording head, applying an alternating current to the thermal fly height control element to dither the magnetic recording head to produce a magnetic recording head signal, monitoring the dithered magnetic recording head signal, and detecting a touchdown or contact based upon variations in the dithered magnetic recording head signal.

In another embodiment, a method comprises applying a direct current to a thermal fly height control element of a heat assisted magnetic recording head, applying an alternating current to a thermal fly height control element to dither the heat assisted magnetic recording head to produce a heat assisted magnetic recording head signal, monitoring the dithered heat assisted magnetic recording head signal, and detecting a near field transducer touchdown or contact based upon variations in the dithered heat assisted magnetic recording head signal.

In another embodiment, a method comprises applying a direct current to a light source of a heat assisted magnetic recording head, applying an alternating current to the light source to dither a near field transducer to produce a near field transducer signal, monitoring the dithered near field transducer signal, and detecting a near field transducer touchdown based upon variations in the dithered near field transducer signal.

In another embodiment, a method comprises applying a voltage between a disk and a magnetic recording head, applying an alternating voltage to the magnetic recording head to produce a dithered magnetic recording head signal, monitoring the dithered magnetic recording head signal, and detecting a touchdown of a near field transducer on the disk based upon variations in the dithered magnetic recording head signal.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments in any field involving magnetic sensors.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments. However, it should be understood that the disclosure is not limited to specific described embodiments. Instead, any combination of the following features and elements, whether related to different embodiments or not, is contemplated to implement and practice the claimed subject matter. Furthermore, although embodiments described herein may achieve advantages over other possible solutions and/or over the prior art, whether or not a particular advantage is achieved by a given embodiment is not limiting of the claimed subject matter. Thus, the following aspects, features, embodiments and advantages are merely illustrative and are not considered elements or limitations of the appended claims except where explicitly recited in a claim(s).

Embodiments disclosed herein generally relate to contact at the disk by the recording head in a hard disk drive. In one embodiment, a direct current is applied to an element in a HAMR head. An alternating current is then applied to the element over top of the direct current to cause the HAMR head to dither. By monitoring the head signal at the dither frequency, a touchdown or contact of a NFT on a disk may be detected based upon variations in the produced signal.

Figure 1A:
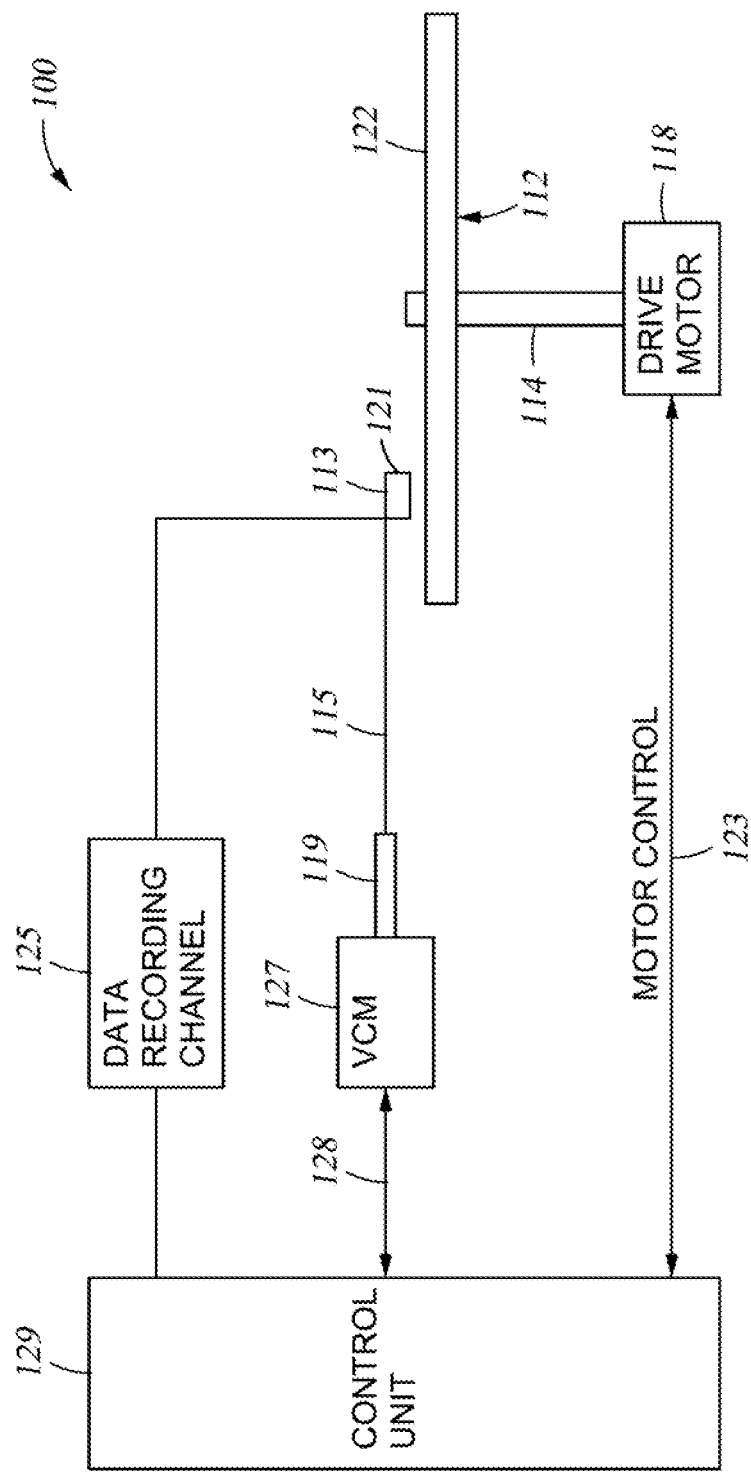
FIGS. 1A and 1B illustrate a disk drive system according to embodiments described herein.

FIG. 1A illustrates a disk drive 100 embodying this disclosure. As shown, at least one rotatable magnetic media 112 is supported on a spindle 114 and rotated by a disk drive motor 118. The magnetic recording on each media is in the form of any suitable patterns of data tracks, such as annular patterns of concentric data tracks (not shown) on the magnetic media 112.

At least one slider 113 is positioned near the magnetic media 112, each slider 113 supporting one or more magnetic head assemblies 121 that may include a radiation source (e.g., a laser or LED) for heating the media surface 122. As the magnetic media 112 rotates, the slider 113 moves radially in and out over the media surface 122 so that the magnetic head assembly 121 may access different tracks of the magnetic media 112 to read or record data. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1A may be a voice coil motor (VCM). The VCM includes a coil movable within a fixed magnetic field, the direction and speed of the coil movements being controlled by the motor current signals supplied by control unit 129.

During operation of a HAMR enabled disk drive 100, the rotation of the magnetic media 112 generates an air bearing between the slider 113 and the media surface 122 which exerts an upward force or lift on the slider 113. The air bearing thus counter-balances the slight spring force of suspension 115 and supports slider 113 slightly above the media 112 surface by a small, substantially constant spacing during normal operation. The radiation source heats up the high-coercivity media so that the write elements of the magnetic head assembly 121 may correctly magnetize the data bits in the media.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1A are for representation purposes only. It should be apparent that disk storage systems may contain a large number of media and actuators, and each actuator may support a number of sliders.

Figure 1B:
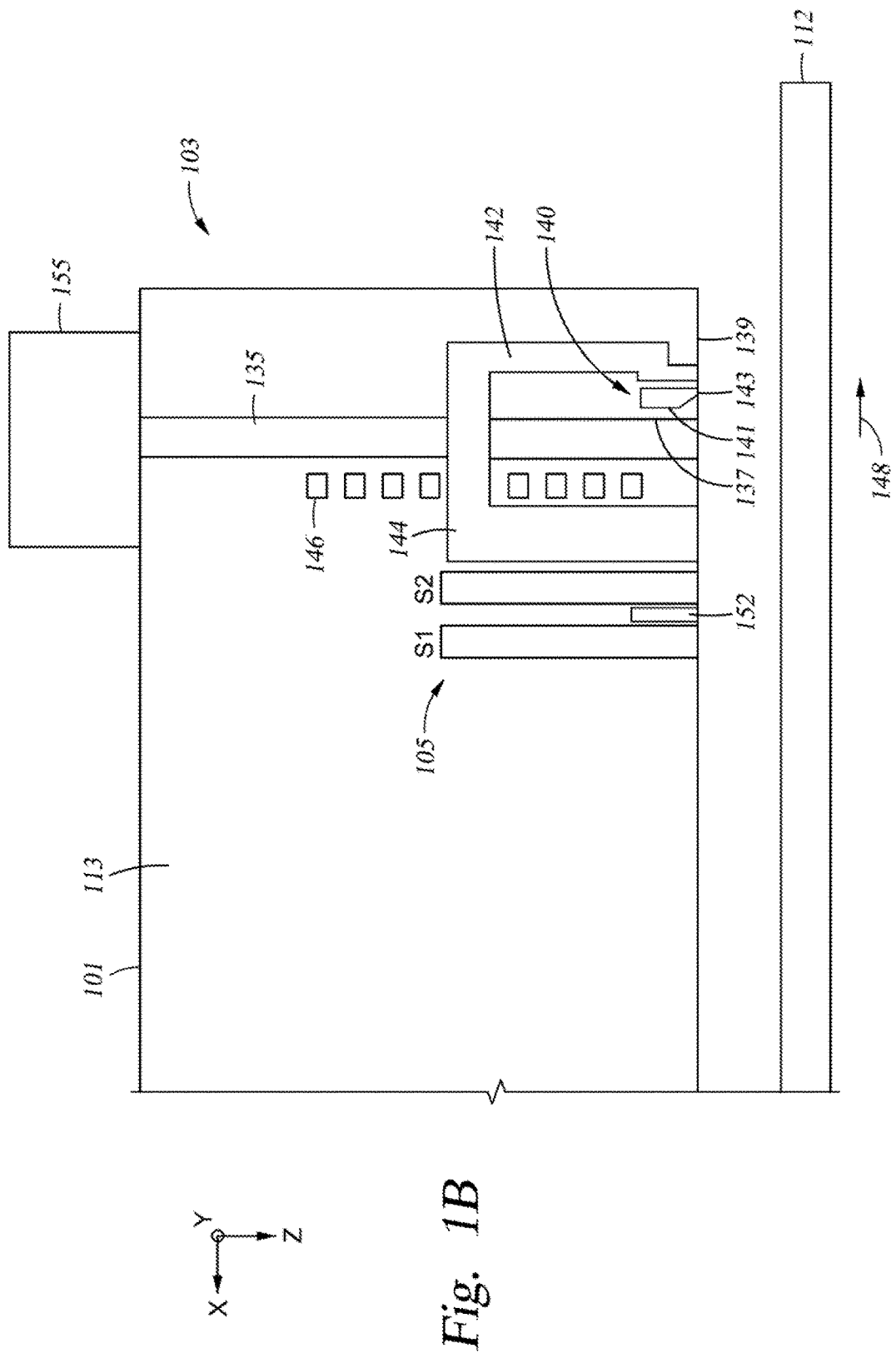

FIG. 1B is a fragmented, cross sectional side view of a HAMR read/write head 101 and magnetic media 112 of the disk drive 100 of FIG. 1A. The read/write head 101 may correspond to the magnetic head assembly 121 described in FIG. 1A. The read/write head 101 includes a media facing surface (MFS) 139, such as an air bearing surface (ABS), a write head 103 and a magnetic read head 105, and is mounted on the slider 113 such that the MFS 139 is facing the magnetic media 112. As shown in FIG. 1B, the magnetic media 112 moves past the write head 103 in the direction indicated by the arrow 148. As shown in FIG. 1B, the X direction denotes an along-the-track direction, the Y direction denotes a track width or cross-track direction, and the Z direction denotes a direction substantially perpendicular to the MFS 139.

In some embodiments, the magnetic read head 105 is a magnetoresistive (MR) read head that includes an MR sensing element 152 located between MR shields S1 and S2. In other embodiments, the magnetic read head 105 is a magnetic tunnel junction (MTJ) read head that includes a MTJ sensing element 152 located between MR shields S1 and S2. The magnetic fields of the adjacent magnetized regions in the magnetic media 112 are detectable by the MR (or MTJ) sensing element 152 as the recorded bits.

The write head 103 includes a main pole 142, a waveguide 135, a NFT 140 disposed between the main pole 142 and the waveguide 135, a return pole 144, and a coil 146 that excites the main pole 142. A spot size converter (not shown) may be coupled to the NFT 140 and may be substantially parallel to the waveguide 135. The write head 103 may be operatively attached to a laser 155 (i.e., a radiation source or a light source). The laser 155 may be placed directly on the write head 103 or radiation may be delivered from the laser 155 located separate from the slider 113 through an optical fiber or waveguide 135. The waveguide 135 is a channel that transmits the radiation through the height of the write head 103 to the NFT 140—e.g., a plasmonic device or optical transducer—which is located at or near the MFS 139.

When radiation, such as laser 155, is introduced into the waveguide 135, an evanescent wave is generated at a surface 137 of the waveguide 135 that couples to a surface plasmon excited on a surface 141 of the NFT 140. The surface plasmon propagates to a surface 143 of the NFT 140, and an optical near-field spot is generated near an apex (not shown) of the surface 143 for heating a localized area of the disk 112. The laser 155, through the NFT 140, heats up the high-coercivity data bits of the disk 112 so that the write elements of the head 101 may correctly magnetize the data bits. Upon receiving radiation from the laser 155, the NFT 140 heats up, which causes the NFT 140 to expand toward the surface of the disk 112. This expansion reduces the spacing between the NFT 140 and the disk 112. In other embodiments, the waveguide 135 may not extend to the MFS 139, and the NFT 140 may be disposed at an end of the waveguide 135, so the NFT 140 is aligned with the waveguide 135. Gold is typically used for the NFT 140 material in order to achieve a high optical efficiency. The embodiments herein, however, are not limited to any particular type of radiation source or technique for transferring the energy emitted from the radiation source to the MFS 139. The NFT 140 as shown in FIG. 1B is a nanobeak NFT. However, the NFT 140 is not limited to any particular type of NFT. In some embodiments, the NFT 140 is an e-antenna NFT or a lollipop NFT.

Figure 2A:
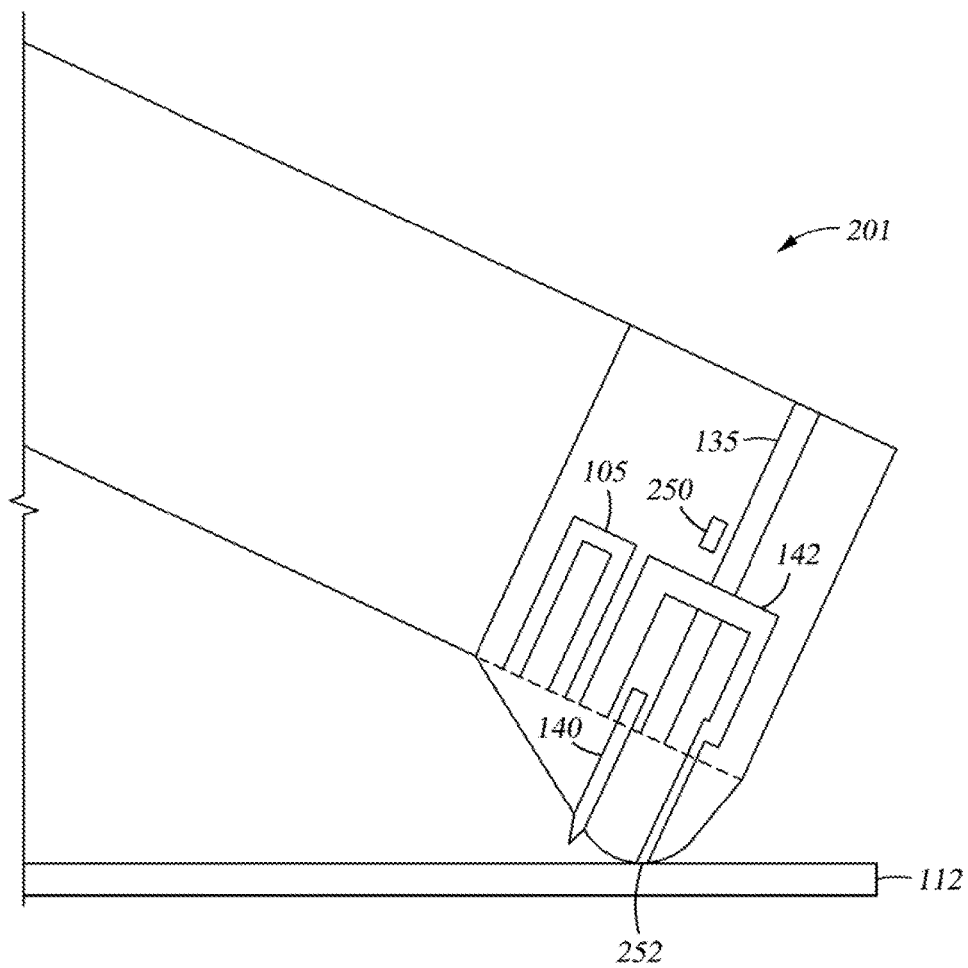
FIGS. 2A and 2B illustrate a schematic HAMR read/write head when touching down on a disk.
Figure 2B:
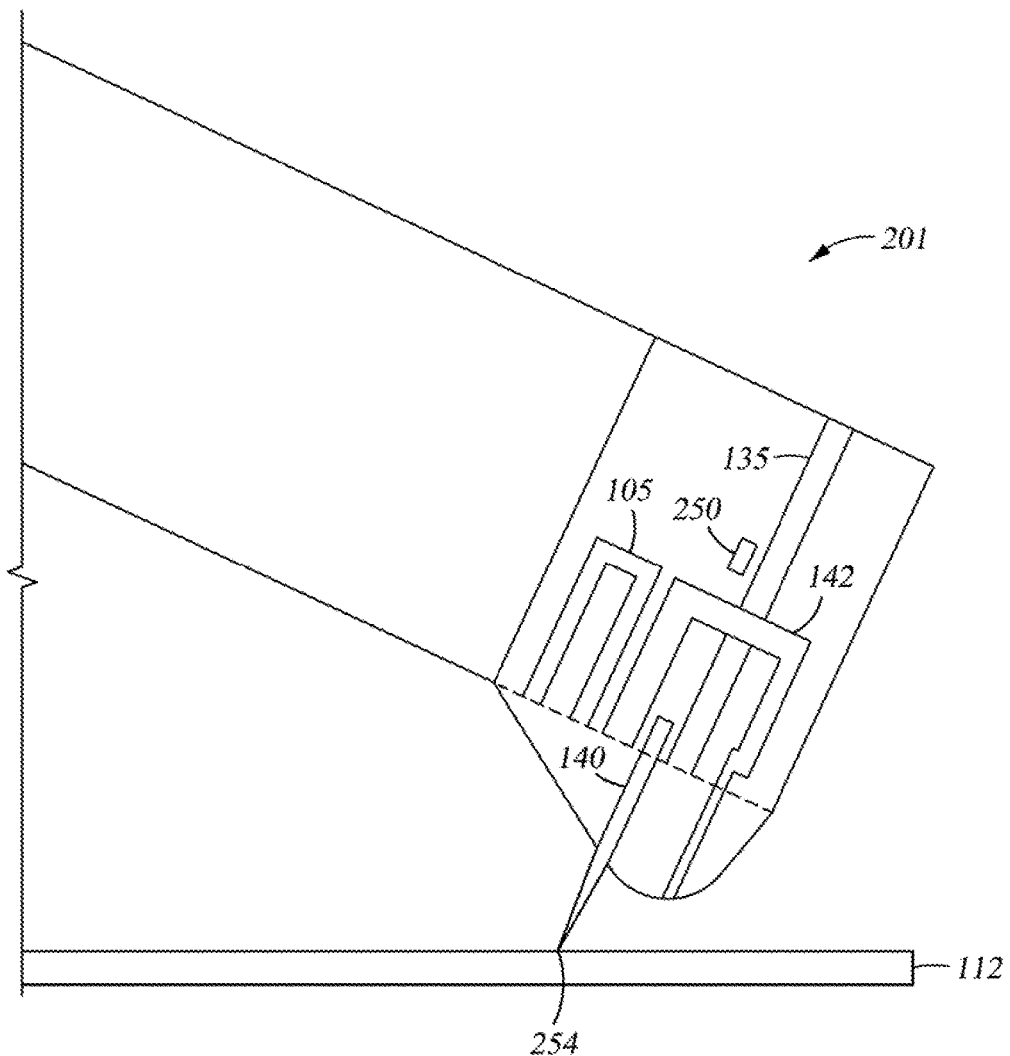

FIGS. 2A and 2B illustrate a schematic HAMR read/write head 201 touching down on a disk 112. The read/write head 201 may be the read/write head 101 of FIG. 1B. As shown in FIGS. 2A and 2B, a TFC element 250 thermally actuates the head 201 by creating a protrusion at the MFS, which controls the distance between the elements in the head 201 and the disk 112, or the clearance. A TFC element 250 may be included in a magnetic disk drive as a means of bringing the HAMR head 201 closer to the disk 112. The TFC element 250 may be configured from a heating element, and power is applied to cause the protrusion of the head 201 to extend towards the disk 112.

FIG. 2A illustrates the head 201 protruding down to properly contact the surface of the disk 112 at contact point 252. Both the main pole 142 and the NFT 140 may protrude towards the surface of the disk 112 with the head 201 due to thermal expansion. Due to such expansion, the NFT 140 may contact the surface of the disk 112 at contact point 254, as shown in FIG. 2B, causing the NFT 140 to degrade. Thus, the contact point of the head 201 on the disk 112 may shift due to the TFC element 250 creating the protrusion.

Both the NFT 140 and the head 201 may contact the disk 112 at the same time. The signal for the head 201 touching down on the disk 112 is significantly greater than the signal produced by the NFT 140 touching down. Consequently, the signal produced by the NFT 140 touchdown may be rendered undetectable, and the NFT 140 would degrade. Additionally, the NFT 140 may touchdown without the head 201 touching down, as shown in FIG. 2B. However, the NFT 140 does not produce a detectable signal. Thus, it can be difficult to determine when the NFT 140 is touching down or in contact with the disk 112, resulting in degradation of the NFT 140.

Figure 3:
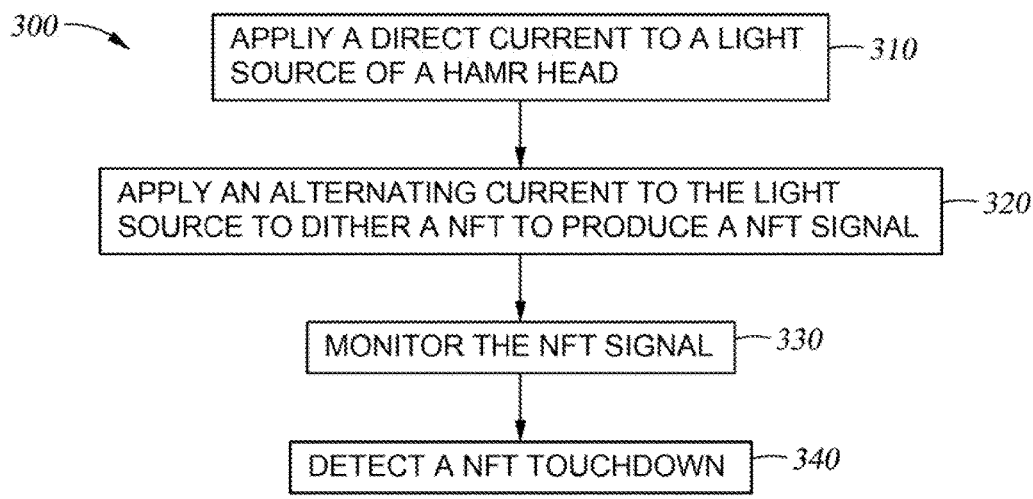
FIG. 3 is a schematic flow chart illustrating a method of detecting a NFT touchdown.

FIG. 3 illustrates a method 300 of detecting a NFT contact or touchdown on a disk. The method 300 may be utilized on the HAMR head 101 depicted in FIG. 1B or HAMR read/write head 201 in FIGS. 2A and 2B. At operation 310, a direct current is applied to a light source of a HAMR head. The light source may be the laser 155 of FIG. 1B. At operation 320, an alternating current is applied to the light source over top of the direct current. Applying the alternating current to the light source causes the light source to dither, or oscillate. In one embodiment, the light source is dithered at a frequency range between 10 kHz-1 MHz. The dithering light source in turn causes the NFT to dither, producing a NFT signal. The dithering NFT produces a signal significant enough to be detected, regardless if the HAMR head touches down and produces a larger signal. Once the NFT starts dithering, the head may briefly make contact with the disk, and then back off of the disk. By monitoring the NFT signal at operation 330, a touchdown of the NFT on the disk may be detected at operation 340. The touchdown may be detected based upon variations in the dithered NFT signal. Because the NFT signal is detectable, the SNR may be improved.

By detecting the NFT touchdown, the NFT clearance may be calculated based upon variations in the dithered NFT signal. In one embodiment, the NFT may be dithered by applying a voltage between the disk and the recording head. An alternating voltage may then be applied to the recording head or to the disk to produce a dithered recording head signal. By monitoring the dithered recording head signal, a touchdown or contact of the NFT on the disk may be detected based upon variations in the dithered recording head signal. The NFT may be dithered to a minimum modulation depth of 1 angstrom. Dithering the NFT enhances the contact detection sensitivity. Thus, the NFT touching down on the disk may be detected.

Figure 4:
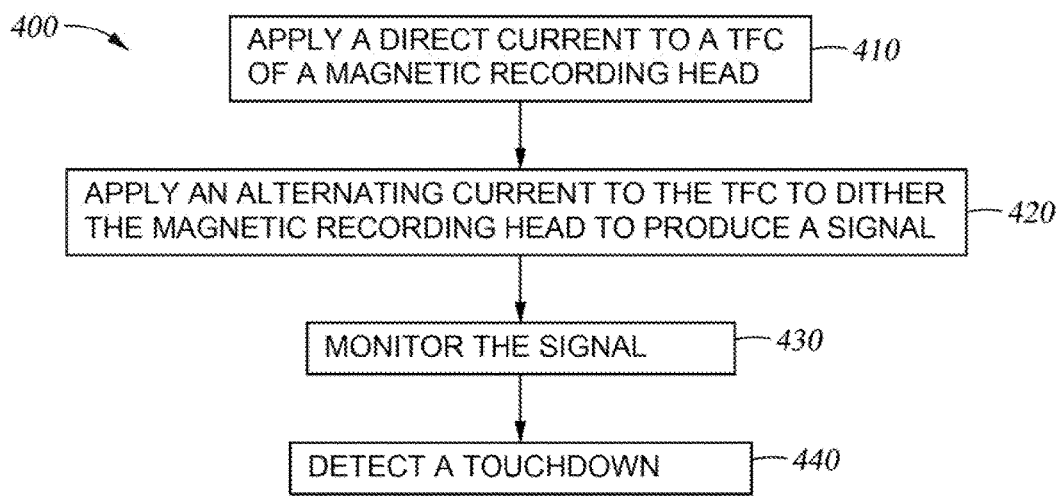
FIG. 4 is a schematic flow chart illustrating a method of detecting a touchdown of the read/write head.

FIG. 4 illustrates a method 400 of detecting a touchdown of a magnetic recording head on a disk. Method 400 may be utilized with a non-HAMR head. At operation 410, a direct current is applied to a TFC element of a magnetic recording head. At operation 420, an alternating current is applied to the TFC element over top of the direct current. Applying the alternating current to the TFC element causes the TFC element to dither, subsequently causing the magnetic recording head to dither, producing a signal. The signal may be a magnetic recording head signal. In one embodiment, the TFC element is dithered at a frequency range between 10 kHz-1 MHz. Once the head starts dithering, the head may briefly make contact with the disk, and then back off of the disk. The contact point of the head on the disk may be dithered. By monitoring the dithered signal at operation 430, a touchdown may be detected at operation 440. The touchdown detected may be the head making contact with the disk. The touchdown or contact of the head may be detected based upon variations in the dithered signal. The signal produced by the touchdown is large, and the SNR may be improved. The magnetic recording head may modulate at least 1 angstrom. In one embodiment, the head may be dithered using IVC. The clearance of the head may be calculated based upon variations in the dithered signal.

Additionally, the HAMR read/write head 101 in FIG. 1B or HAMR read/write head 201 in FIGS. 2A and 2B may be used to implement the method 400. The touchdown detected at operation 440 may be the NFT contacting the disk. The NFT touchdown may be detected based upon variations in the dithered magnetic head signal. The NFT clearance may also be calculated based upon variations in the dithered magnetic head signal. The NFT may be dithered to a minimum modulation depth of 1 angstrom. The sensitivity of detecting the NFT touchdown increases with the modulation depth. Thus, method 400 may be used to detect touchdowns of both the magnetic head and the NFT.

Figure 5:
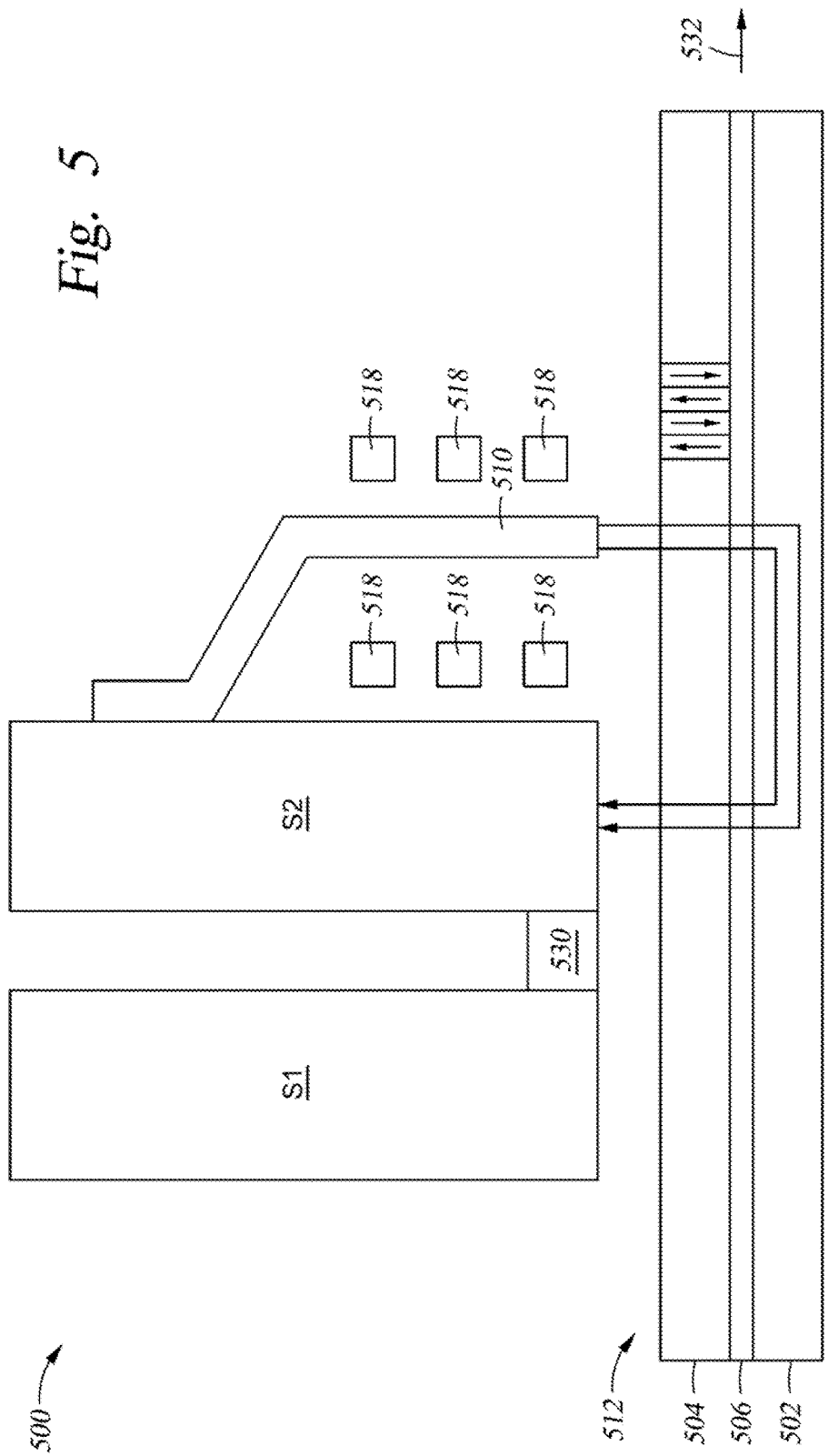
FIG. 5 illustrates a side view of an exemplary read/write head and magnetic disk of the disk drive.

FIG. 5 is a fragmented, cross-sectional side view through the center of a non-HAMR magnetic recording read/write head 500 facing magnetic disk 512. The read/write head 500 of FIG. 5 may be use to implement the method 400 of FIG. 4. The read/write head 500 and magnetic disk 512 may correspond to the magnetic head 101 and magnetic disk 112, respectively in FIG. 1B. In some embodiments, the magnetic disk 512 may be a "dual-layer" medium that includes a perpendicular magnetic data recording layer (RL) 504 on a "soft" or relatively low-coercivity magnetically permeable underlayer (PL) 506. The PL 506 may be on a substrate 502. The read/write head 500 includes a MFS, a magnetic write head and a magnetic read head, and is mounted such that its MFS is facing the magnetic disk 512. In FIG. 5, the disk 512 moves past the head 500 in the direction indicated by the arrow 532. The RL 504 is illustrated with perpendicularly recorded or magnetized regions, with adjacent regions having magnetization directions, as represented by the arrows located in the RL 504. The magnetic fields of the adjacent magnetized regions are detectable by the sensing element 530 as the recorded bits. The write head includes a magnetic circuit made up of a main pole 510 and a thin film coil 518 shown in the section embedded in a non-magnetic material. FIG. 5 differs from FIG. 1B in that the magnetic read/write head 500 excludes at least a waveguide and a NFT. The magnetic recording read/write head 500 is only one example of a read/write head that may be used to implement the method of 400 in a non-HAMR head.

In summary, a method for detecting a magnetic recording head or a NFT touchdown on a disk is disclosed. The touchdown may be detected based on dithering either a light source, such as a laser, or a magnetic read/write head. The dithering light source or head causes the NFT to dither, allowing the NFT to produce a signal large enough to be detected. Variations in the NFT signal signify a NFT touchdown, prevent the NFT from degrading.

While the foregoing is directed to embodiments of the disclosure, other and further embodiments may be devised without departing from the basic scope thereof, and the scope thereof is determined by the claims that follow.

What is claimed is:

1. A method, comprising;
applying a direct current to a thermal fly height control element of a magnetic recording head that is configured to fly over a disk;
applying an alternating current to the thermal fly height control element to dither the magnetic recording head to produce a magnetic recording head signal;
monitoring the dithered magnetic recording head signal;
contacting the disk with the magnetic recording head and backing the magnetic recording head off while the dithered magnetic recording head signal is monitored; and
detecting a touchdown based upon variations in the dithered magnetic recording head signal.

2. The method of claim 1, wherein the magnetic recording head is a non-heat assisted magnetic recording head.

3. The method of claim 1, wherein the alternating current is applied while the direct current is applied to the thermal fly height control element.

4. The method of claim 1, further comprising calculating a clearance of the magnetic recording head from the disk.

5. The method of claim 4, wherein the magnetic recording head modulates at least 1 angstrom.

6. The method of claim 1, wherein the magnetic recording head modulates at least 1 angstrom.

7. A method, comprising:
applying a direct current to a thermal fly height control element of a heat assisted magnetic recording head that is configured to fly over a disk;
applying an alternating current to a thermal fly height control element to dither the heat assisted magnetic recording head to produce a heat assisted magnetic recording head signal;
monitoring the dithered heat assisted magnetic recording head signal; and
detecting a touchdown of a near field transducer based upon variations in the dithered heat assisted magnetic recording head signal.

8. The method of claim 7, wherein the alternating current is applied while the direct current is applied to the thermal fly height control element.

9. The method of claim 8, wherein the near field transducer modulates at least 1 angstrom.

10. The method of claim 7, further comprising calculating a clearance of the near field transducer from the disk.

11. The method of claim 7, wherein the near field transducer comprises gold.

12. The method of claim 7, further comprising contacting the disk with the heat assisted magnetic recording head and backing the heat assisted magnetic recording head off while the dithered heat assisted magnetic recording head signal is monitored.

13. A method, comprising:
applying a direct current to a light source of a heat assisted magnetic recording head that is configured to fly over a disk;
applying an alternating current to the light source to dither a near field transducer to produce a near field transducer signal;
monitoring the dithered near field transducer signal; and
detecting a touchdown of the near field transducer based upon variations in the dithered near field transducer signal.

14. The method of claim 13, wherein the alternating current is applied while the direct current is applied to the light source.

15. The method of claim 14, wherein the near field transducer modulates at least 1 angstrom.

16. The method of claim 13, wherein the near field transducer comprises gold.

17. The method of claim 13, further comprising calculating a clearance of the near field transducer from the disk.

18. The method of claim 13, further comprising contacting the disk with the heat assisted magnetic recording head and backing the heat assisted magnetic recording head off while the dithered near field transducer signal is monitored.

19. The method of claim 13, wherein the near field transducer modulates at least 1 angstrom.

20. A method, comprising:
applying a voltage between a disk and a magnetic recording head;
applying an alternating voltage to the magnetic recording head to produce a dithered magnetic recording head signal;
monitoring the dithered magnetic recording head signal; and
detecting a touchdown of a near field transducer on the disk based upon variations in the dithered magnetic recording head signal.

* * * * *